(12) United States Patent
McLaughlin et al.

(10) Patent No.: US 8,755,566 B1
(45) Date of Patent: Jun. 17, 2014

(54) METHODS FOR ASSESSING LINE OF SIGHT RADIO SERVICE AVAILABILITY AND RECEPTION CHARACTERISTICS

(75) Inventors: Edgar J. McLaughlin, Lloyd Harbor, NY (US); Alan Pate, New Fairfield, CT (US); Richard J. Spanbauer, Port Jefferson, NY (US); Mark Gaudino, Manhasset, NY (US)

(73) Assignee: CSC Holdings, LLC, Bethpage, NY (US)

( * ) Notice: Subject to any disclaimer, the term of this patent is extended or adjusted under 35 U.S.C. 154(b) by 107 days.

(21) Appl. No.: 13/506,630

(22) Filed: May 4, 2012

Related U.S. Application Data

(63) Continuation-in-part of application No. 13/067,649, filed on Jun. 16, 2011, now Pat. No. 8,582,808.

(51) Int. Cl.
*G06K 9/00* (2006.01)
*B60H 1/00* (2006.01)

(52) U.S. Cl.
USPC .......................................... 382/103; 454/136

(58) Field of Classification Search
USPC .......... 382/103, 107, 236, 239; 348/169, 170, 348/171, 172, 208.1, 208.2, 208.14; 454/136, 242, 250; 52/272, 302.1, 52/746.11, 749.12
See application file for complete search history.

(56) References Cited

U.S. PATENT DOCUMENTS 7,920,072 B2 * 4/2011 Smith et al. ................ 340/995.1
8,065,854 B1 * 11/2011 Doberstein et al. ........ 52/746.11

\* cited by examiner

*Primary Examiner* — Abolfazl Tabatabai
(74) *Attorney, Agent, or Firm* — Sterne, Kessler, Goldstein & Fox P.L.L.C.

(57) ABSTRACT

In an embodiment, a method for determining whether a residential unit is capable of receiving a line of sight (LOS) radio service from one or more radio transmitters providing line of sight radio service within a service area is provided. In another embodiment, a method for determining the placement of an antenna on a rooftop to receive LOS radio service is provided. In each embodiment, methods for creating a residential units data set for a service area including data representative of rooftops of residential units and their location is provided. In an embodiment, the residential units data set is based on light detection and ranging (LIDAR) data.

21 Claims, 20 Drawing Sheets

Sample Area - Image

600

Sample Area: 8-30 Feet AGL

Sample Area: Use of Land Parcel Boundaries

Sample Area: After Filtering Based on Land Parcel Boundaries

Sample Area / Sample Area with Slope Overlay

Sample Area: After Slope Filtering

1100

Example Area: After applying Building Unit Area Filter

1300

Single Family Land Parcel Density (Green=>500/square mile)

US 8,755,566 B1

METHODS FOR ASSESSING LINE OF SIGHT RADIO SERVICE AVAILABILITY AND RECEPTION CHARACTERISTICS

CROSS-REFERENCE TO RELATED APPLICATIONS

This application is a continuation-in-part of U.S. patent application Ser. No. 13/067,649, filed on Jun. 16, 2011, entitled Method for Identifying Rooftops Using Elevation Data Sets, which is incorporated herein by reference in its entirety.

BACKGROUND OF THE INVENTION

1. Field of the Invention

This invention relates generally to determining rooftop visibility from a transmitter for line of sight (LOS) wireless communication services, and more specifically to the use of elevation data for determining service availability for LOS radio services.

2. Background Art

Being able to efficiently determine the visibility from a transmitter for LOS wireless communications services to a service location is critical to effective service rollout. For large geographical regions, rooftops are typically manually/visually located using geo-coded aerial photography. Street addresses are normally estimated from location using conventional GPS-style interpolations. Unfortunately, the resulting information is often difficult to obtain, and roof heights and locations cannot be reliably determined from normal aerial photography. Thus, the determination of transmitter sites is extremely cumbersome and often time unreliable. Additionally, making assessments as to whether line of sight exists from a transmitter site to a location for which service may be desired is also difficult and often times unreliable. Finally, placement of antennas at a location to increase the likelihood of reliable LOS service is not readily and reliably available.

What are needed therefore are systems, methods, and computer program products that enable efficient determination of the visibility from a transmitter for LOS radio services to a service location.

BRIEF SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In an embodiment, a computer-implemented method for determining whether a residential unit is capable of receiving a line of sight radio service from one or more radio transmitters providing line of sight radio service within a service area is provided. The method includes receiving a request to determine whether the residential unit is capable of receiving the line of sight radio service. A residential units data set for the service area, based on a light detection and ranging (LIDAR) data set that includes data representative of residential units with each residential unit having rooftop data and location information is accessed. A determination is made whether a rooftop for the received residential unit has line of sight to one or more radio transmitters sufficient to enable the residential unit to receive the line of sight radio service. An indication is generated that identifies whether the residential unit is capable of receiving the line of sight radio service.

In another embodiment, a computer-implemented method for determining the placement of an antenna on a rooftop to receive line of sight radio service is provided. The method includes receiving a request for placement of the antenna on a residential unit. Upon receipt of the request, a transmitter to provide the line of sight radio service to the residential unit is determined. A residential units data set for the service area based on a light detection and ranging (LIDAR) data set that includes data representative of a residential units with each residential unit having rooftop data and location information is accessed. A cross section analysis of a line of sight from the transmitter with data representative of the rooftop to identify regions on the rooftop that have line of sight with the transmitter is determined. The regions on the rooftop that have line of sight with the transmitter are displayed.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 5:

FIG. 5 provides an aerial photography image of a sample geographic area.

Figure 6:
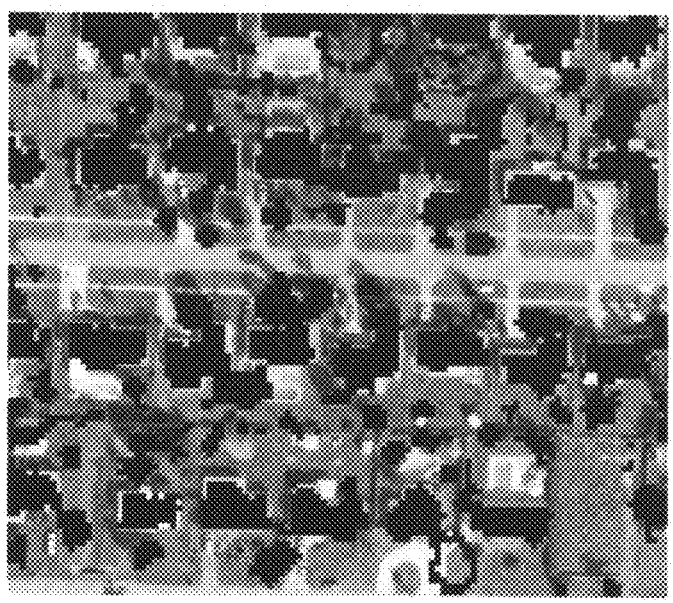

FIG. 6 illustrates a sample area following the application a height mask, according to an embodiment of the invention.

Figure 7:

FIG. 7 illustrates a sample area following the application of a land parcel mask, according to an embodiment of the invention.

Figure 8:

FIG. 8 illustrates a sample area following the application of a land parcel mask in which clutter has been removed, according to an embodiment of the invention.

Figure 9A:

FIG. 9a provides an aerial photography image of a sample area.

Figure 9B:

FIG. 9b provides a LIDAR data image of the sample area of FIG. 9a that highlights the slope differences of trees and rooftops, according to an embodiment of the invention.

Figure 10:

FIG. 10 illustrates a sample area after a slope filter has been applied, according to an embodiment of the invention.

Figure 11:

FIG. 11 illustrates a sample area after a building unit area filter has been applied, according to an embodiment of the invention.

Figure 12:
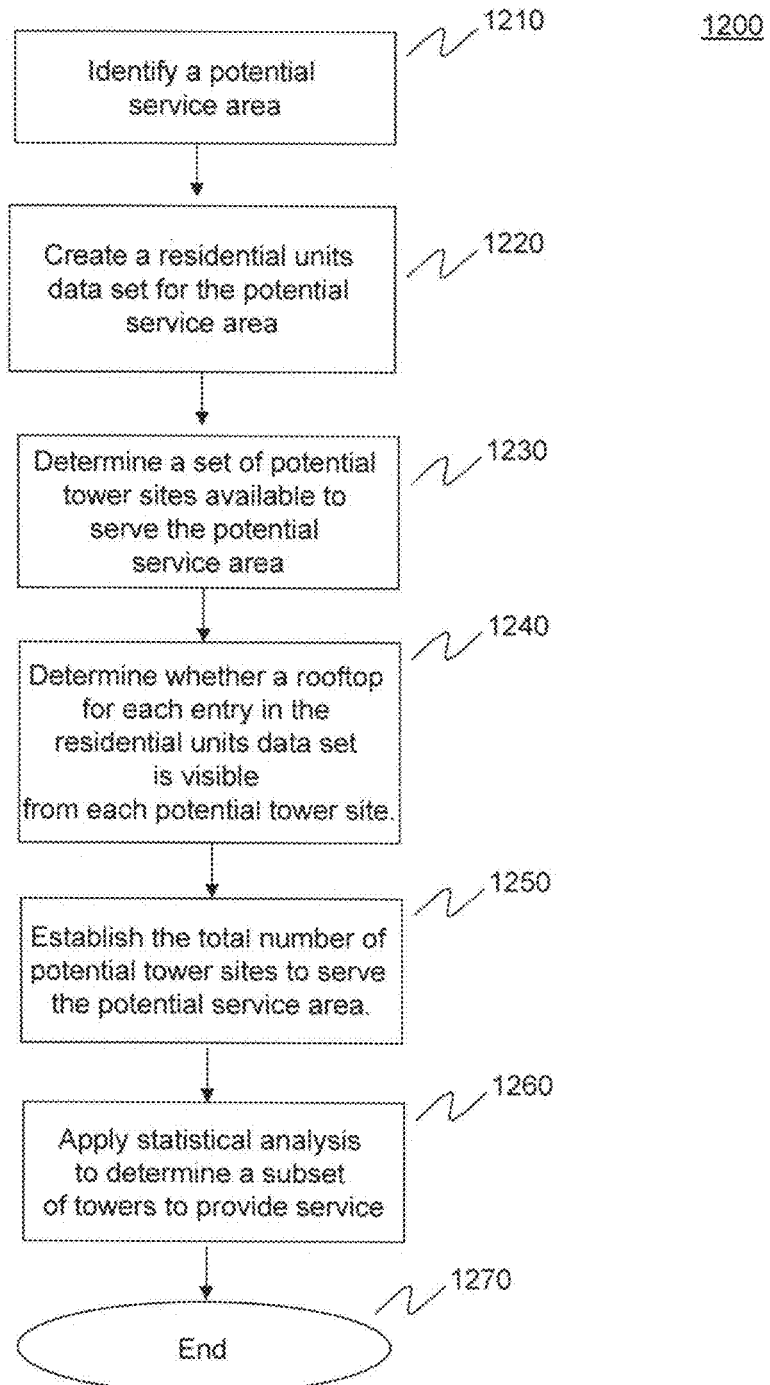

FIG. 12 is a flowchart of a method for transmitter site selection for a line of sight (LOS) radio service, according to an embodiment of the invention.

Figure 13:
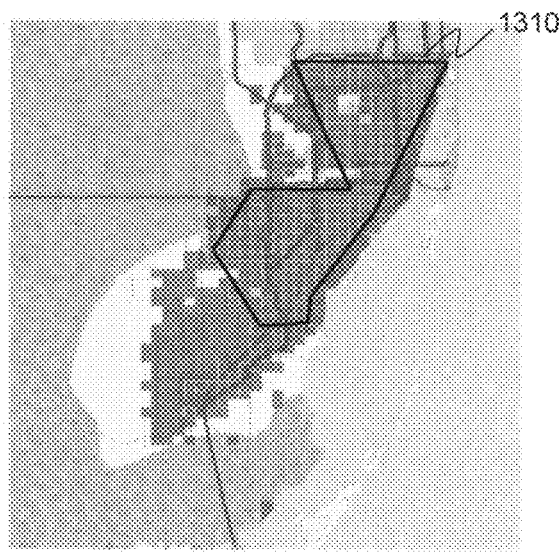

FIG. 13 provides a density map for a region identifying a potential service area, according to an embodiment of the invention.

Figure 14:
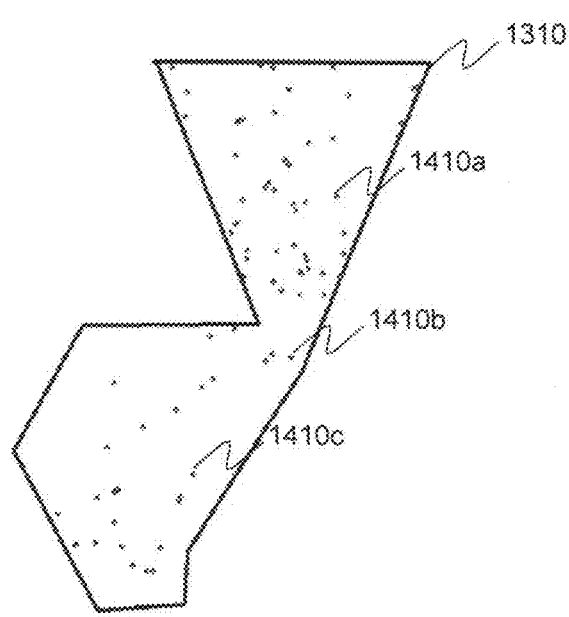

FIG. 14 provides a diagram of transmitter sites after height filtering, according to an embodiment of the invention.

Figure 15:
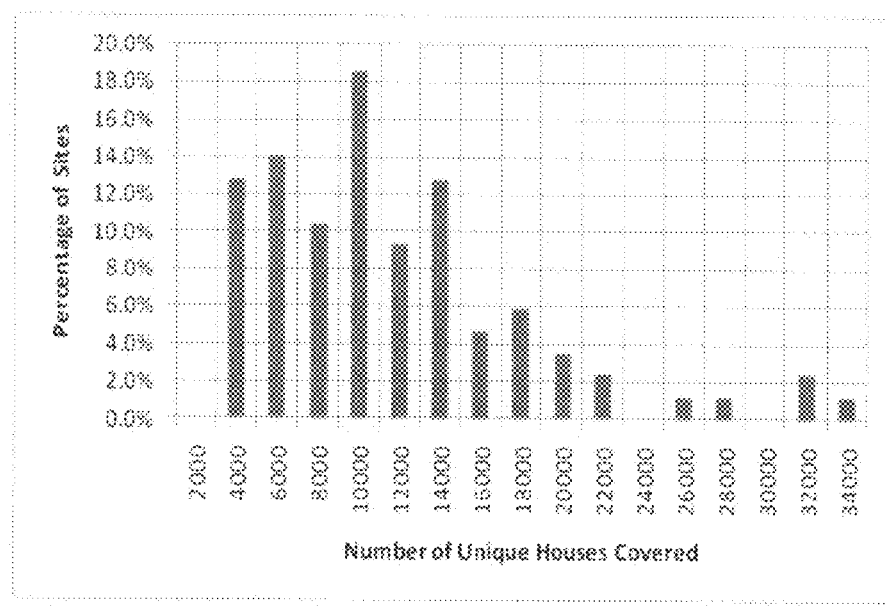

FIG. 15 shows the distribution of houses covered by each transmitter site without regard to coverage overlap, according to an embodiment of the invention.

Figure 16:
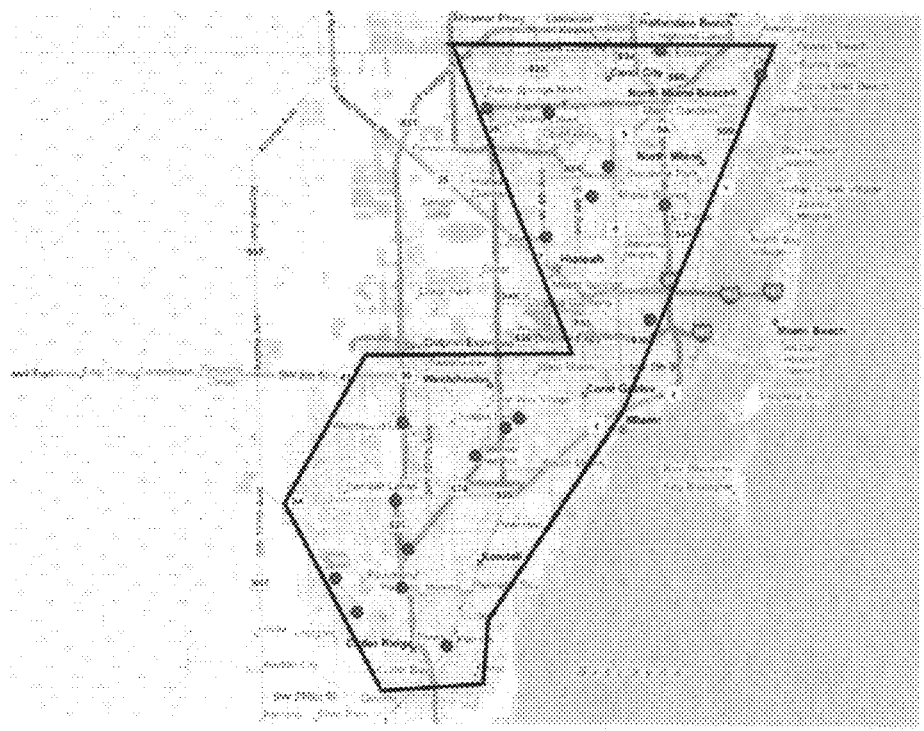

FIG. 16 shows an example transmitter site selection, according to an embodiment of the invention.

Figure 17:
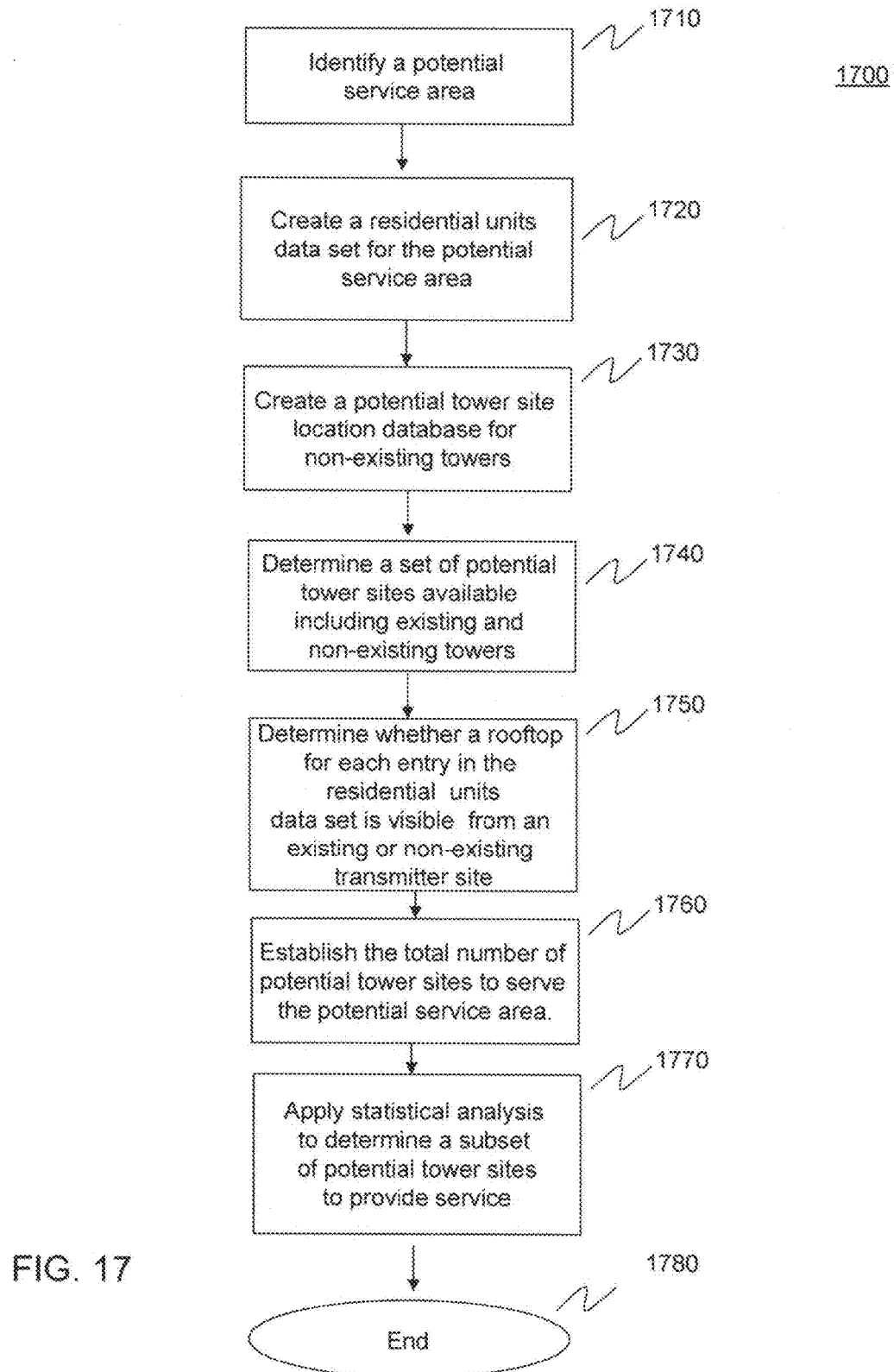

FIG. 17 is a flowchart of a computer-implemented method for identifying a location for a transmitter site for a line of sight (LOS) radio service, according to an embodiment of the invention.

Figure 18:
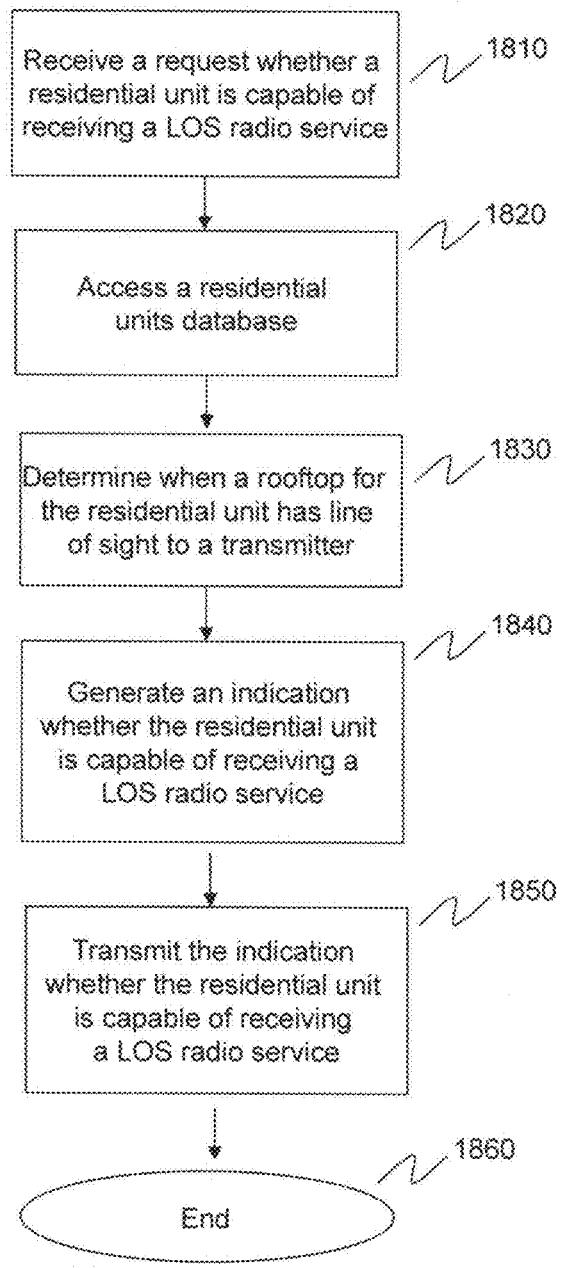

FIG. 18 is a flowchart of a computer-implemented method for determining whether a residential unit is capable of receiving a line of sight radio service from one or more radio transmitters within a set of radio transmitters providing the line of sight radio service within a service area, according to an embodiment of the invention.

Figure 19:
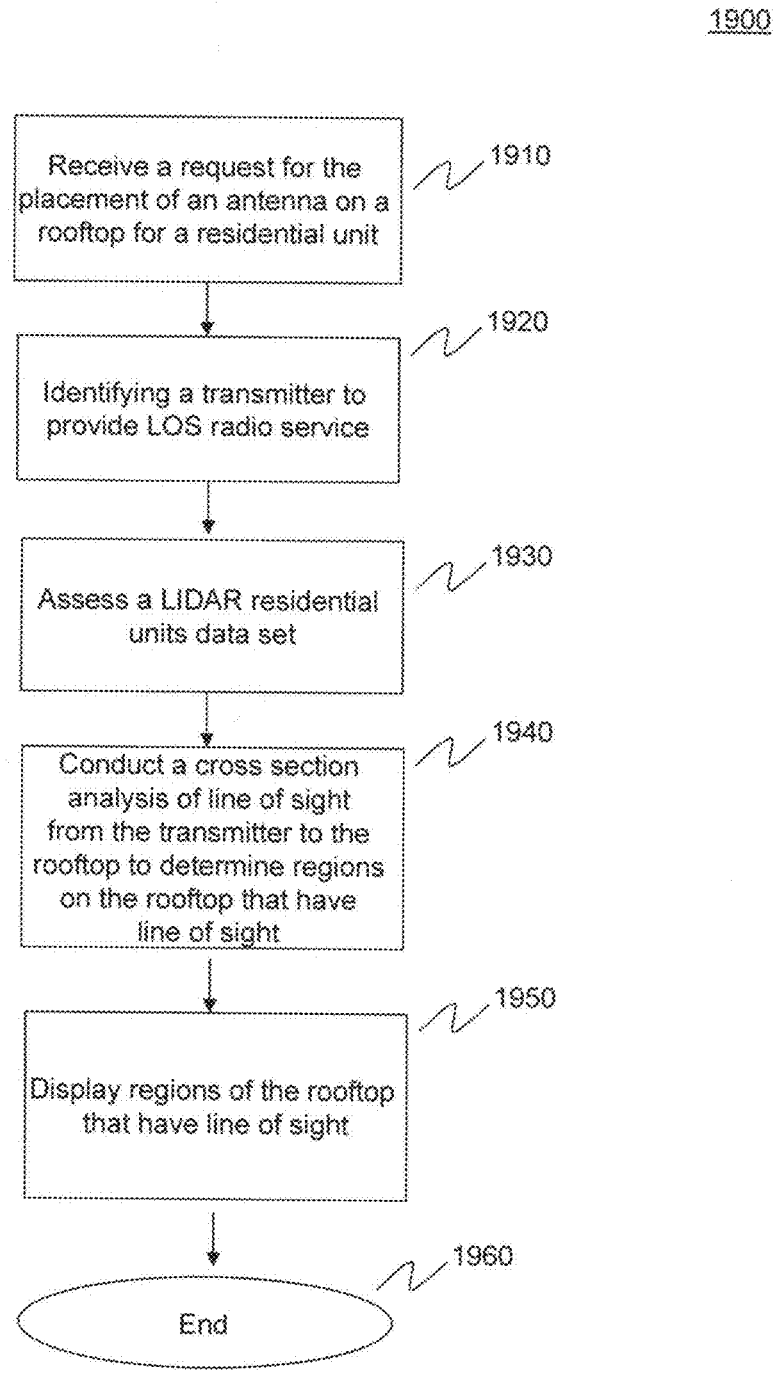

FIG. 19 is a flowchart of a computer-implemented method for determining the placement of an antenna on a rooftop to receive a line of sight radio service, according to an embodiment of the invention.

Figure 20:
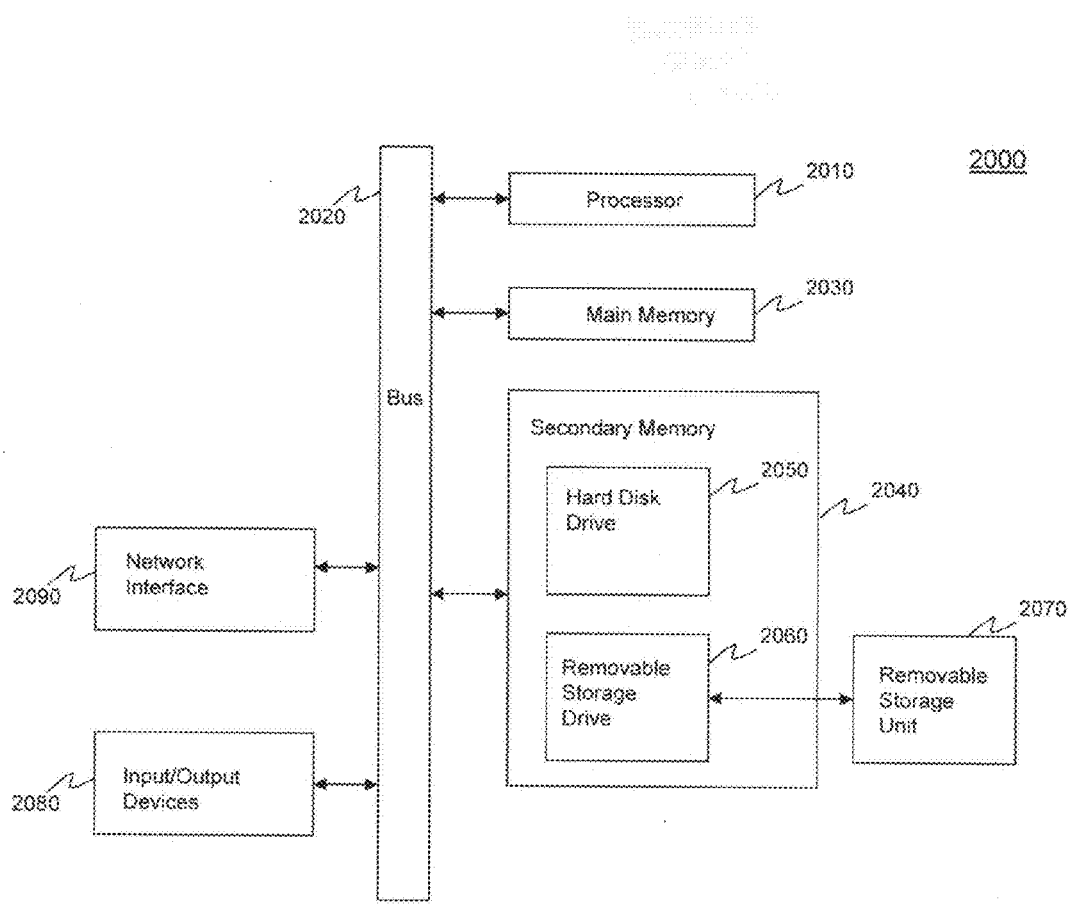

FIG. 20 provides a diagram of a computer system on which the methods and systems herein described can be implemented, according to an embodiment of the invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 1:
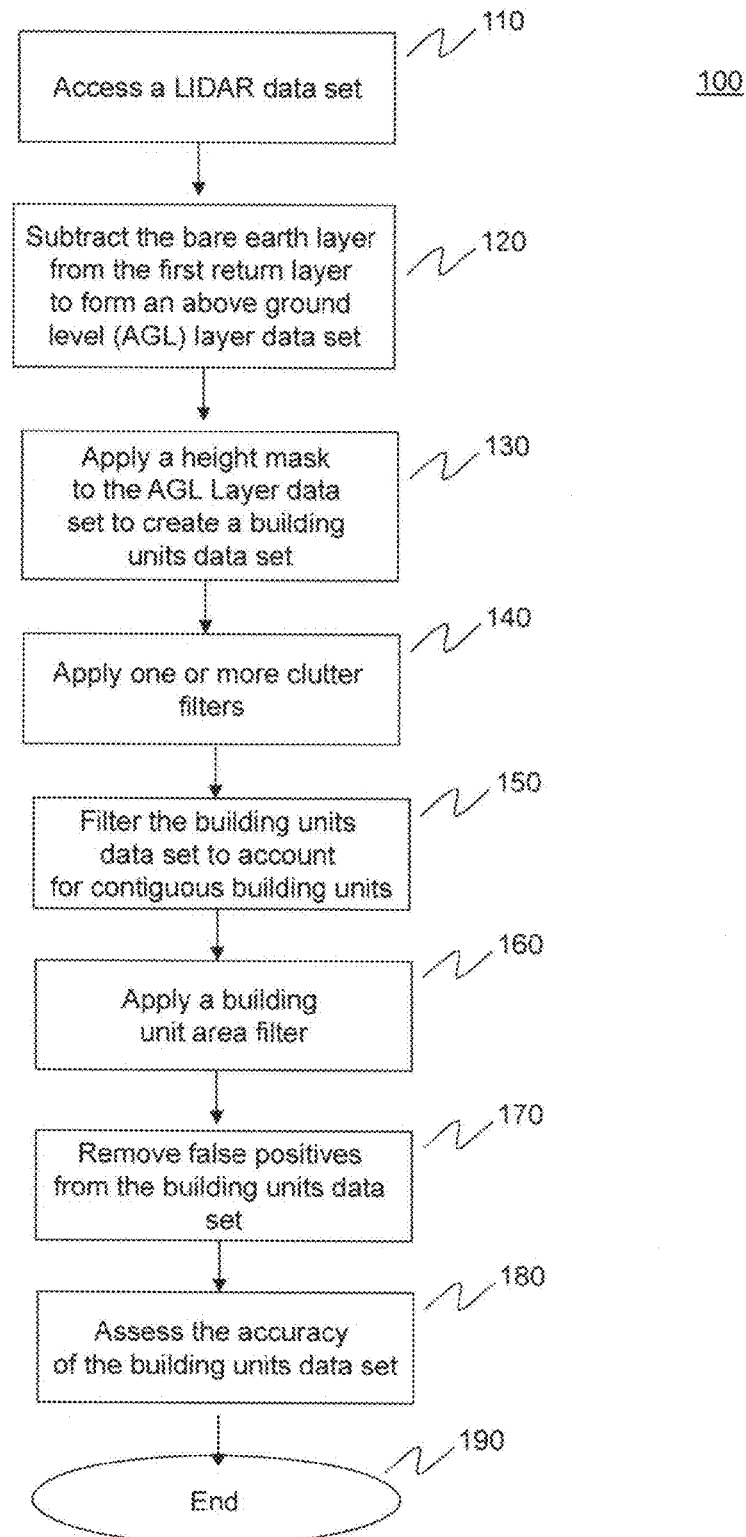
FIG. 1 is a flowchart of a computer-implemented method for identifying rooftops, according to an embodiment of the invention.

FIG. 1 provides a method 100 for identifying building unit rooftops, according to an embodiment of the invention. Method 100 begins in step 110. In step 110, a light detection and ranging (LIDAR) data set for a geographic area of interest is accessed. The LIDAR data set is gridded into a bare earth layer and a first return layer, which may be referred to generally as a surface layer. The example embodiments throughout the specification refer to LIDAR data sets. The invention is not limited to the use of LIDAR data. Rather, other types of elevation data can be used, such as, for example, data collected by RADAR or a variant of three-dimensional photography. Additionally, in embodiments the bare earth layer and first return layer (or surface layer) data may be obtained through different measurement techniques.

LIDAR describes a profiling system that produces location and elevation data to define the surface of a geographic area and the heights of above ground features. LIDAR systems mounted on aircraft use the near-infrared portion of the electro-magnetic light spectrum to collect data. Other types of LIDAR systems can be used to gather the LIDAR data set, including, but not limited to, remote controlled airborne systems and vehicular mounted systems.

Typical airborne LIDAR systems use a laser source and detector, a scanning mechanism, airborne GPS and inertial measurement unit (IMU) equipment, and high resolution clocking devices for timing laser emissions, reflections, GPS/IMU measurements, and scan-angle measurements. High performance computers and high capacity data recorders are also used.

LIDAR systems collect data in the following manner. Multiple flight lines of a LIDAR system are conducted over an area of interest. During the flight lines, repeated laser light pulses are emitted and the precise time recorded. The reflection of the laser pulses from the surface is detected and the precise time is recorded. Using the constant speed of light, the time difference between the emission and the reflection can be converted into a slant range distance. With the very accurate position and orientation of the sensors provided by the airborne GPS and IMU data, the XYZ coordinate of the reflective surface can be calculated.

In multiple return LIDAR systems, both range and intensity data are obtained from a single pass. Intensity data measure the return signal strength, based on the way the object struck reflects the LIDAR energy. Intensity data is consistent among similar objects, making is possible to map the information in the form of a matrix, giving the appearance of a gray-scale image.

Figure 2:
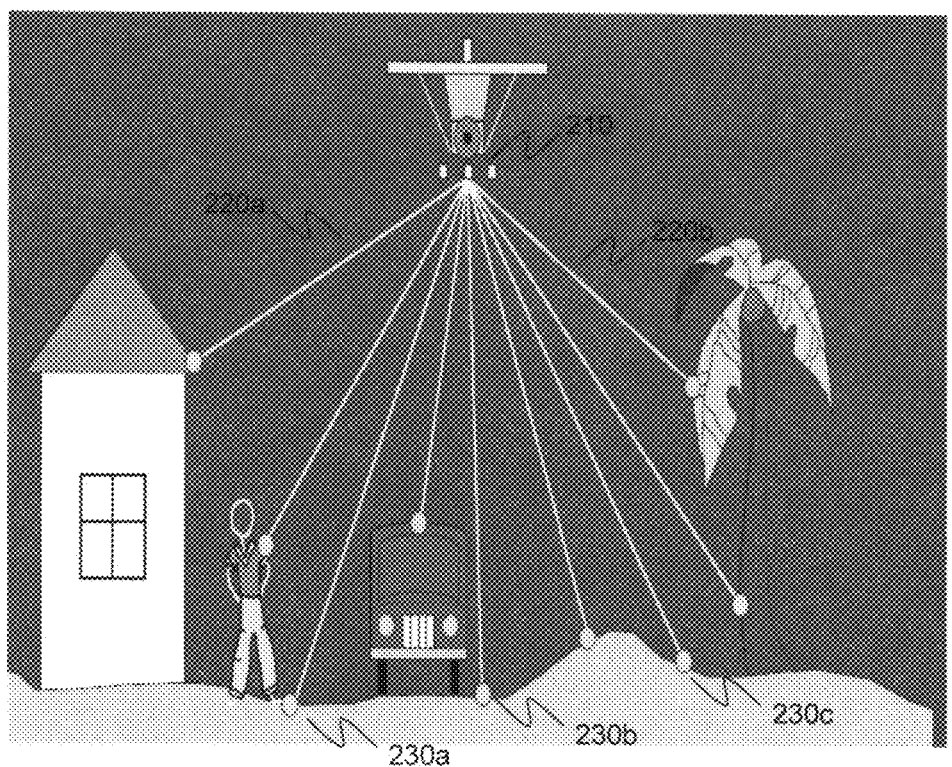
FIG. 2 is an illustration of a multiple return LIDAR system.

FIG. 2 provides a simplified illustration of a multiple return LIDAR system. In multiple return LIDAR systems, the first pulse measures the range to the first object encountered. The last pulse measures the range to the last object. By acquiring first and last pulse data simultaneously; it is possible to measure, for example, both tree and rooftop heights (referred to as a first return layer or a canopy layer) and the topography of the ground level (referred to as a bare earth layer). Referring to FIG. 2, LIDAR system 210 emits laser pulses, such as pulses 220*a-b* and 230*a-c*. Laser pulses 220*a* and 220*b* are representative of first pulses that provide data for the canopy layer, whereas laser pulses 230*a*, 230*b* and 230*c* are representative of secondary pulses that provide data for the ground level or bare earth level.

Figure 3:
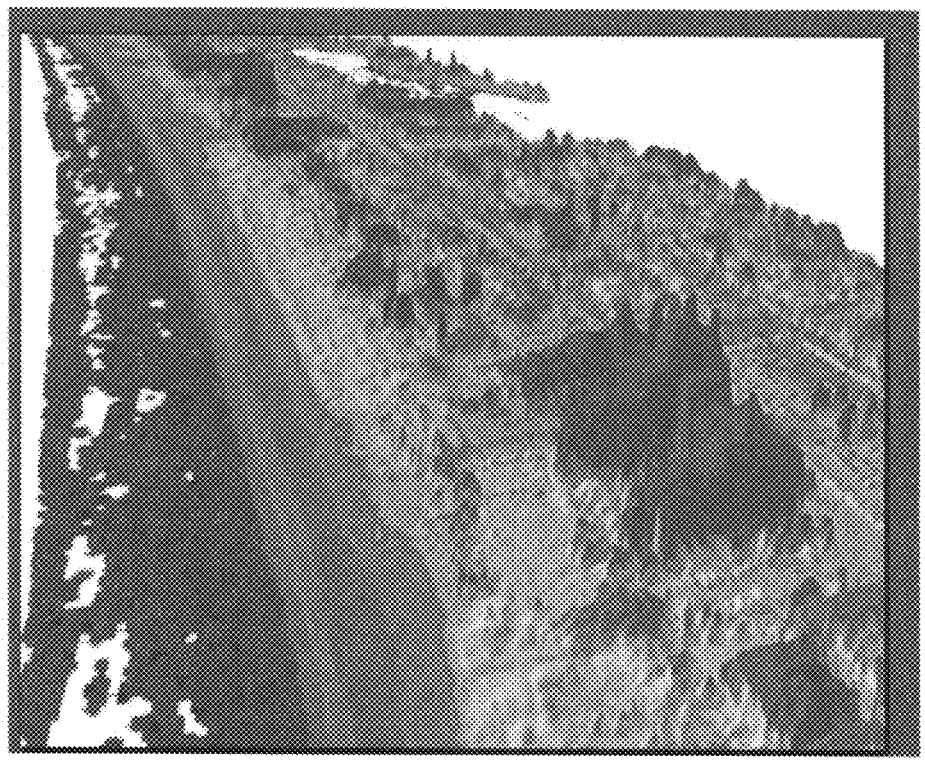
FIG. 3 is an image of LIDAR data that shows variation in height and slope of objects within a geographic area.
Figures 4A, 4B:
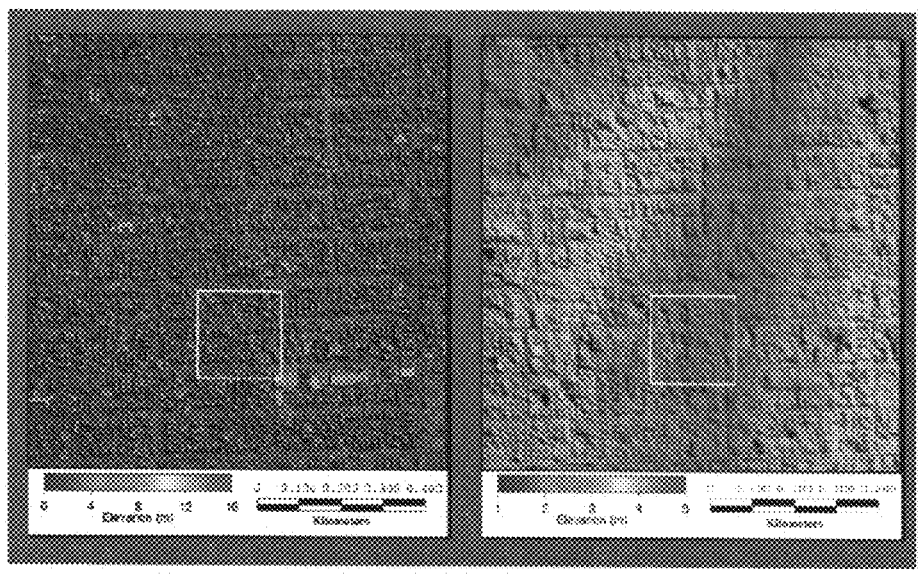
FIG. 4a is an image of LIDAR data that shows a bare earth layer.
FIG. 4b is an image of LIDAR data that shows a canopy level layer.

Upon completing a series of flight lines to gather the LIDAR data, a geographic area can be represented in a three dimensional image that identifies the location, height and slope of objects. Once such depiction is shown in FIG. 3. FIG. 3 provides an image of LIDAR data that shows variation in height and slope using a color scheme in which higher elevation items are depicted in red, lower elevation in yellow and ground level items in shades of green. FIG. 4*a* provides a bare earth layer for a portion of FIG. 3, while FIG. 4*b* provides a canopy level layer for the same portion of FIG. 3.

LIDAR data sets are extensive in size. For example, the methods described herein were developed using LIDAR data for three geographical areas. Area A included 207,000 acres (one county). Collecting the data used 152 flight lines, and the data included 563 million data points. Area B included 100,000 acres (one county). Collecting the data used 36 flight lines, and the data included 281 million data points. Area C included 218,000 acres (one county). Collecting the data used 147 flight lanes, and the data included 1.45 billion data points. The data sets were organized into 5000×5000 foot tiles that included first return or canopy layer data and bare earth layer data. The LIDAR data sets analyzed include a sampled resolution of 4-5 feet in the horizontal direction and a few tens of centimeters accuracy in the vertical dimension.

Returning to FIG. 1, in step 120, the bare earth layer is subtracted from the first return layer to form an above ground level (AGL) layer data set. For example, the ARCGIS 3D ANALYST "minus" function is applied to the LIDAR data set to form the AGL layer data set. ARCGIS is a standards-based system for using geographic information, and manipulating LIDAR data. ARCGIS is available from Esri Corporation, headquartered in Redlands, Calif.

For the purpose of illustrating the remaining steps within method 100, FIGS. 5-10 will be used to highlight each of the steps and the impact the steps have on the LIDAR data set to develop and refine a building units data set. FIG. 5 provides an example area using aerial photography. This image will be used as a baseline image to highlight how the various filtering and masking steps are used to condition and analyze the LIDAR data to develop a building units data set that provides height, location, and slope information corresponding to rooftops. While FIG. 5 only shows residential building units and method 100 is explained in the context of residential building units, the invention is not limited to residential building units, but also applies to commercial building units as will be known to individuals of ordinary skill in the art upon reviewing the present specification.

In step 130, a height mask is applied to the AGL layer data set to form a building units data set. The building units data set includes data representative of potential building unit rooftops. In an embodiment, applying a height mask to the AGL layer data set to form a building units data set includes establishing two height limits and classifying data values within the range of the two height limits as potential building unit rooftops. The specific parameters of the mask are set based on characteristics of residential home construction in the area under study. Determining the parameters is an empirical and interactive process to try to balance false positives and negatives in targeting houses.

In an embodiment, this step is performed using the ARCGIS 3D Analyst "reclass" function. All terrain values between the two height limits are re-classified to a "1" to form the first estimate of a residential building presence. FIG. 6 illustrates the sample area following the application of this step in which the height parameters used were 8 and 30 feet. The black polygons within FIG. 6 represent structures that fall within this range.

In step 140, one or more clutter filters is applied to remove clutter from the building units data set. To reduce the feature "noise" due to trees, high resolution (1 foot) RGB based imagery, such as is available from the United States Geographical Service can be used. As will be understood by persons of ordinary skill in the art, based on the teachings herein, other RGB based imagery including, but not limited to high resolution color photography, can also be used. This color imagery is corrected to the building units data set to enable removal of clutter through an RGB filter. Specifically, in an embodiment, a color RGB filter is applied to the building units data set to differentiate between rooftops and clutter. For example, to eliminate clutter associated with trees a single color RGB filter is applied to differentiate between rooftops and green trees. The filter or mask developed is used to multiply the height sliced layer produced in step 130. To perform this step, for example, the ARCGIS 3D Analyst "times" function can be used. Data associated with green trees is removed from the building units data set.

In another embodiment, the data representative of potential building unit rooftops is masked with land parcel boundary data. For example, the Florida Department of Revenue maintains a GIS layer documenting all the residential land parcels and their boundaries. See, e.g., ftp://sdrftp03.dor.state.fl.usi. Referring to FIG. 7, the yellow boundaries, such as boundary 710, are the nominal land parcel boundaries. A buffer zone for each land parcel that lies within the land parcel boundaries is established. The red boundaries, such as boundaries 720a, 720b and 720c are derived by taking a 10 foot buffer internal to each of the land parcels to better approximate the location of any residential structure. The 10 foot buffer value can be adjusted to other values for different embodiments. Within each buffer zone, data representative of potential building unit rooftops that exist outside the land parcel buffer zone and within the land parcel boundary is determined to be clutter. The data representative of clutter is removed from the data representative of potential building unit rooftops. FIG. 8 illustrates the sample area following application of a land parcel boundary data mask, as described above, to remove clutter. The red polygons in FIG. 8 illustrate areas remaining following the application of the land parcel boundary data mask. Data for these areas remain in the building units data set.

In another embodiment, a slope filter is applied to the data representative of potential building unit rooftops to remove tree clutter. The slope filter is based on the differences in the slopes of rooftops and trees. When examining the representation of slope for trees versus rooftops in LIDAR data, it is apparent that the measured slope associated with trees can be distinguished from the more gently sloped rooftop signatures. This is illustrated by comparing FIG. 9a and FIG. 9b, where it can be seen that high slope areas are associated with tree structures. The high slope areas within FIG. 9b are illustrated by the more intense red coloration of the image data. These red areas correspond to the trees shown in FIG. 9a. FIG. 10 illustrates the sample area after the slope filtering has occurred. The light green polygons are representative of LIDAR data remaining in the building units data set that are potentially representative of residential rooftops.

In step 150, the building units data set is filtered to account for contiguous building units. The same land parcel data information used in step 140 to remove clutter can also be used. Upon filtering the data set, contiguous building units are divided into multiple individual building units.

In step 160, a building unit area filter is applied. The building unit area filter is applied by converting areas associated with potential building units to polygons. Data within polygons that are that are not within an area range representative of a residential unit are removed from the building units data set. This step eliminates very small features that represent, for example, remaining treetops or bushes from being counted as residential units.

FIG. 11 illustrates the sample area following the application of the building unit area filter. The light blue polygons are representative of LIDAR data within the building units data set that likely represent building unit rooftops. The remaining data within the building unit data set includes data representative of potential residential rooftops that can be used to determine a count of residential units, the height of residential rooftops and the location of residential rooftops.

In an embodiment, in step 170, false positive data from the data representative of potential building unit rooftops is purged based on a comparison of the data representative of potential building unit rooftops and address information.

In various embodiments, in step 180, tests of the accuracy of the building units data set are conducted. In an embodiment, a count of potential residential units based on the data representative of potential building unit rooftops is made. This count is then compared with census counts to assess the accuracy of the data representative of potential building unit rooftops. In another embodiment, the accuracy of the building units data set is assessed by matching the data representative of potential building unit rooftops with address information. In step 190, method 100 ends. Upon the completion of method 100, a building units data set exists that includes data representing of building unit rooftops that provides height, location, and slope information. Such a database of data sets is extremely useful, for among other uses, determining viewsheds for wireless transmitters to facilitate the deployment of wireless communications services.

Specifically, in one application the building units data set is used to determine the viewsheds for Multichannel Video and Data Distribution Service (MVDDS). MVDDS is a type of video, television and Internet delivery technology that used spectrum in the 12.2 to 12.7 GHz range to provide fast downloads. Using the building units data set permits cost-effective selection of transmitter sites for the placement of MVDDS antennas. This use is described below with reference to FIG. 12. The building units data set can also be used to identifying a location to place a transmitter site for line of sight radio service. This is described with reference to FIG. 17 below. Additionally, in terms of customer service utility, in an embodiment, an extracted database is loaded into a smartphone or other mobile device, such as a tablet or laptop computer, that includes an attribute flag that indicates whether a building unit is visible from a MVDDS transmitter site. Embodiments to determine whether a building unit is capable of receiving a line of sight radio service are described with respect to FIG. 18 below. This facilitates the ability of salespeople to readily identify homes to target for sales activities. Additionally, data is extracted from the building units data set that allows installation personnel to identify the ideal location on a rooftop for placement of an antenna, as described below with respect to FIG. 19.

The use of the present invention is not limited to MVDDS services, but can be used for any application requiring the identification of rooftops. For example, although direct broadcast satellite (DBS) only needs to understand the clearance in the immediate area around the home location at some raised elevation as opposed to a lengthy path between the home and transmitter, as in the case of MVDDS service. DBS service planners could also use the present invention to determine the visibility of each individual DBS satellite.

Though the above embodiments have been described with respect to elevation data for a geographic area of earth, persons skilled in the relevant arts will recognize that the systems and methods disclosed can be applied to the identification of target objects in any layered data set comprising at least two layers of data, and representing other than geographic objects in a geographic landscape. The layers of data in the layered data set may be either gridded or complete. They could have been obtained from a single source or process, or from multiple sources or processes. A variety of filters, including without limitation, height filters, slope filters, shape filters, size filters, discontinuity filters, as well as combinations of such, may be used to identify potential target objects.

Throughout the embodiments discussed in FIGS. 12-19, for ease of discussion the focus of the discussion is on the provision of a line of sight radio service to residential locations. However, the invention is not limited to embodiments involving only residential locations. The scope of the invention also extends to commercial buildings, as will be known to one of ordinary skill in the art based on the teachings herein.

FIG. 12 provides a flowchart of a method 1200 for transmitter site selection for a line of sight (LOS) radio service, according to an embodiment of the invention. Method 1200 begins in step 1210. In step 1210 a potential service area is identified. For example, the service to be provided may be MVDDS service. In an example, a criteria of 500 single family residential land parcels per square mile is used to identify potential service areas. FIG. 13 provides a density map for a region with potential service area 1310 outlined in black in the diagram providing a potential service area meeting the criteria of 500 single family residential land parcels per square mile. In this example, the potential service is approximately 238 square miles and is contiguous. Although, the potential service area need not be contiguous.

In step 1220 a building units data set for the potential service area is created. The building units data set includes an indication of the location of residential units. As discussed above, in an embodiment the building units data set is created by accessing a light detection and ranging (LIDAR) data set for the potential service area. The LIDAR data set is gridded into a bare earth layer and a first return layer. The bare earth layer is then subtracted from the first return layer to form an above ground level (AGL) layer data set. A height mask is then applied to the AGL layer data set to form the building units data set, which includes data representative of potential building unit rooftops. As discussed above various filtering and other algorithms can be applied to the building unit data set to further refine the data set to more accurately identify pixel data within the data set that is associated with residential rooftops. Addresses for the residences associated with the residential rooftops can then be determined, as explained above. In an embodiment, a residential demographic information data set is associated with the building units data set that includes demographic information associated with each of the residential unit locations to establish a residential units data set.

In step 1230 a set of potential transmitter sites available to serve the potential service area is determined. Transmitter site information is obtained from a number of sources, including, but not limited to Federal Communications Commission (FCC) Antenna Structure Registration Database, and commercial databases, such as those provided by American Tower, Crown Castle and Global Tower. Additionally, potential transmitter site information would be augmented by drive surveys of critical areas.

In an embodiment, transmitter site criteria that a transmitter site must meet to be included in the set of potential transmitter sites are determined. Transmitter site criteria include, for example, one or more of a transmitter height threshold, transmitter site rental fee threshold, transmitter site lease factors, a demographic factor of the potential service area, or transmitter site rental fee thresholds as a function of a demographic factor of the potential service area. Transmitter sites that meet the transmitter site criteria are then included within the set of potential transmitter sites available. Referring back to the potential service area of FIG. 13, the assumed available transmitter heights were assumed to be 75% of the transmitter height, or in the case of a building, the building rooftop height: In this example, the process of filtering the transmitter database for the potential service area of FIG. 13, included removing any transmitter site that had a transmitter height of less than 100 feet. FIG. 14 depicts the transmitters within the set of transmitters for serving the potential service area that meet this criteria.

In step 1240 a determination is made for each entry within the residential units data set whether a rooftop for the entry within the residential units data set is visible from each potential transmitter site within the set of potential transmitter sites. In an embodiment, this determination is made by applying an ARCGIS viewshed function to determine whether each entry within the residential units data set is visible from each potential transmitter site. In another embodiment, the residential units data set is adjusted to reduce self-shadowing around each transmitter site.

Referring to FIG. 14, in this example, the transmitter sites, such as sites 1410*a-c*, are used to derive viewshed layers assuming that a height of 75% of the tower maximum height is available (or the building rooftop height, if the site is a building). Steps are taken to avoid "self shadowing" due to any LIDAR returns from the actual tower itself corrupting the first return data. Also, in this example, for sites at the edges of the proposed service area 1310, there are areas where the viewshed calculation has no data, such as the areas where 4 miles is actually in the Ocean. In total, viewshed calculations were conducted for 88 transmitter sites out to a distance of 4 miles each.

In step 1250 a total number of potential transmitter sites to serve the potential service area is established. In embodiments, the total number of potential transmitter sites to service the potential service area is based upon a capital budget or upon an idealized number of transmitter sites to provide service coverage. Referring to FIG. 14, in this example, the required number of transmitter sites is estimated from the service coverage area (238 square miles). Assuming an average service radius per site of 2 miles and a simple grid network design, this indicates a potential total site count of 19 sites, assuming perfect locations.

In step 1260 a statistical analysis is applied to determine a subset of the set of potential transmitter sites that can provide service coverage to the potential service area. The number of transmitter sites within the subset equals the established total number of potential transmitter sites. In an embodiment, a Monte Carlo statistical analysis is used.

A site visibility database provides each of the houses visible from a transmitter site. In order to analyze a multi-site network, the results for each site need to be combined. This is done by sequentially adding an additional attribute for each transmitter to the house layer. This additional attribute is the visibility of a specific house from a particular transmitter (i.e. the viewshed outcome). Referring to the example depicted in FIG. 14, an additional filter was applied to ensure that a site used in the analysis had a coverage of at least 2000 homes. This reduced the total number of sites from 88 to 81.

In this example, the filtering process resulted in 81 individual site viewsheds being placed into a database table with rows corresponding to an individual LIDAR derived residential rooftop and columns corresponding to a specific transmitter site. At each entry there is a "1" if the house is visible from the site or a "0" if it is not. FIG. 15 shows the distribution of houses covered by each site individually without regard to overlap.

Referring to the example of FIG. 14, a Monte Carlo Method statistical analysis was applied using a range of possible network sizes to show different deployment options. Using the 81 site visibility database, the Monte Carlo analysis was run for a maximum number of 5, 10, 15, 19, 25, 30, 35, 40 transmitter sites. 10,000 iterations were used for each run to establish the maximum homes covered through the Monte Carlo analysis. The results are shown in the table below.

| Total Number Of Sites | Homes Covered | Homes per Site (average) |
| --- | --- | --- |
| 5 | 100,620 | 20124 |
| 10 | 143,230 | 14323 |
| 15 | 162,900 | 10860 |
| 19 | 181,120 | 9533 |
| 25 | 193990 | 7760 |
| 30 | 201570 | 6719 |
| 35 | 209330 | 5981 |
| 40 | 214060 | 5352 |

The table shows that overall "efficiency" in coverage diminishes rapidly with increasing transmitter sites due to the overlap and available height/location features of this particular set of available sites. Based on the business model for a particular area, a determination of the number of sites can be selected that optimizes the desired business results.

FIG. 16 illustrates the transmitter site selection generated using the 19 transmitter site criteria. The automatically selected sites are not necessarily spaced on a regular grid, as a manual placement would have been. The objective function maximizes the number of visible houses and so it is possible that two selected sites be quite close together and still generate high combined values of houses covered due to different views from each transmitter.

In step 1270 method 1200 ends.

FIG. 17 provides a flowchart of method 1700 of a computer-implemented method for identifying a location for a transmitter site for a line of sight (LOS) radio service, according to an embodiment of the invention.

Method 1700 begins in step 1710. In step 1710 a potential service area is identified. In an embodiment, a similar approach to that described relative to step 1210 referring to FIG. 12 is used.

In step 1720 a residential units data set is created. As discussed above with respect to step 1220, in an embodiment the building units data set is created by accessing a light detection and ranging (LIDAR) data set for the potential service area. The LIDAR data set is gridded into a bare earth layer and a first return layer. The bare earth layer is then subtracted from the first return layer to form an above ground level (AGL) layer data set. A height mask is then applied to the AGL layer data set to form the building units data set, which includes data representative of potential building unit rooftops. As discussed above various filtering and other algorithms can be applied to the building units data set to further refine the data set to more accurately identify pixel data within the data set that is associated with residential rooftops. Addresses for the residences associated with the residential rooftops can then be determined, as explained above. In an embodiment, a residential demographic information data set is associated with the building units data set that includes demographic information associated with each of the residential unit locations to establish a residential units data set.

In step 1730 a set of potential transmitter sites available to serve the potential service area is determined. This set of data includes transmitter sites that currently exist. As explained with respect to step 1230, transmitter site information is obtained from a number of sources, including, but not limited to Federal Communications Commission (FCC) Antenna Structure Registration Database, and commercial databases, such as those provided by American Tower, Crown Castle and Global Tower. Additionally, potential transmitter site information would be augmented by drive surveys of critical areas. In an embodiment, transmitter site criteria that a transmitter site must meet to be included in the set of potential transmitter sites are determined. Transmitter site criteria include, for example, one or more of a transmitter height threshold, transmitter site rental fee threshold, transmitter site lease factors, a demographic factor of the potential service area, or transmitter site rental fee thresholds as a function of a demographic factor of the potential service area. Transmitter sites that meet the transmitter site criteria are then included within the set of potential transmitter sites available.

In step 1740 a set of locations for transmitter sites to serve the service area. These are locations where a transmitter currently does not exist, but have attributes such that a transmitter could be located either by affixing a transmitter to a building or other existing structure, or constructing a transmitter tower. In an embodiment, identifying the set of locations for transmitter sites to serve the service area, includes identifying building units within the residential units data set that exceed a transmitter site height threshold and identifying locations suitable for a structure for placing a transmitter. In an embodiment, identifying locations suitable for a structure for placing a transmitter includes locations with a geographical footprint that exceed a site area threshold and permit structures that exceed a transmitter site height threshold.

Additionally, locations from the set of locations for transmitter sites to serve the service area are eliminated that have line of sight to residential units within the residential units data set that is less than a minimum residential units serviced threshold.

In step 1750 for each residential location within the residential units data set a determination is made whether a rooftop of a residential location is visible from each potential transmitter site and from each potential location for a transmitter site, assuming the baseline characteristics that were established in step 1740 for locations where transmitters do not currently exist. In an embodiment, this determination is made by applying an ARCGIS viewshed function to determine whether each entry within the residential units data set is visible from each potential transmitter site and each location for a transmitter site. In another embodiment, the residential units data set is adjusted to reduce self-shadowing around each transmitter site.

In step 1760 a total number of potential transmitter sites to serve the potential service area is established. In embodiments, the total number of potential transmitter sites to service the potential service area is based upon a capital budget or upon an idealized number of transmitter sites to provide service coverage.

In step 1770 a statistical analysis is applied to determine a subset of the set of potential transmitter sites and locations for transmitter sites that can provide service coverage to the potential service area. The number of transmitter sites plus locations for transmitter sites within the subset equals the established total number of potential transmitter sites. In an embodiment, a Monte Carlo statistical analysis is used. Based on this determination, the selected combination of potential tower sites and locations for transmitter sites are determined may include locations for transmitters sites that do not currently have transmitters. These locations are potential locations in which deployment of a transmitter may be appropriate based on business considerations. For example, the results of method 1700 may be compared to the results of method 1200 for the same service area. Depending on the additional coverage provided by locations of transmitter sites that do not have a transmitter as determined by method 1700, a business decision may be made to build-out one of the locations of a transmitter site. Factors to be considered include but are not limited to, the additional revenue from the incremental coverage by building-out a transmitter site location versus estimates of the incremental revenue for a service. More generally, a company in the business of deploying transmitter sites may use the information generated from method 1700 to build out a transmitter site location based on multiple scenarios for different types of services, and assuming different mixes of service provider rental penetration for the transmitter location.

In step 1780, method 1700 ends.

FIG. 18 provides a flowchart of computer-implemented method 1800 for determining whether a residential unit is capable of receiving a line of sight radio service from one or more radio transmitters within a set of radio transmitters providing the line of sight radio service within a service area, according to an embodiment of the invention. In an embodiment of the invention, the line of sight radio service is multi-channel video and data distribution service (MVDDS).

Method 1800 begins in step 1810. In step 1810 a request to determine whether a residential unit is capable of receiving a line of sight radio service from one or more radio transmitters within a set of radio transmitters providing the line of sight radio service within a service area is received. The request includes a location indicator, such as an address, for the rooftop associated with a residence that desires to receive a line of sight radio service. In an embodiment receiving a request includes receiving the request from a requesting device that is remote relative to a device hosting the residential units database set. The requesting device includes, but is not limited to a computer, tablet computer, smartphone or electronic personal data assistant. For example, a sales personnel using a smartphone or tablet computer may wirelessly access a host computer that houses a residential units data set. Alternatively, the residential units data set, or a subset of the residential units data set may be housed within a smartphone or tablet computer, such that there is no need to access a host computer, but rather all data necessary to implement method 1800 is locally maintained.

In step 1820 a residential units data set for the service area is accessed. In an embodiment the residential units data set is based on a light detection and ranging (LIDAR) data set and includes data representative of a plurality of residential units with each residential unit having rooftop data and a location. In embodiments, the rooftop data includes rooftop area, rooftop location, rooftop height and rooftop slope information.

As discussed above with respect to step 1220, in an embodiment a building units data set is created by accessing a light detection and ranging (LIDAR) data set for the potential service area. The LIDAR data set is gridded into a bare earth layer and a first return layer. The bare earth layer is then subtracted from the first return layer to form an above ground level (AGL) layer data set. A height mask is then applied to the AGL layer data set to form the building units data set, which includes data representative of potential building unit rooftops. As discussed above various filtering and other algorithms can be applied to the building units data set to further refine the data set to more accurately identify pixel data within the data set that is associated with residential rooftops. Addresses for the residences associated with the residential rooftops can then be determined, as explained above. In an embodiment, a residential demographic information data set is associated with the building units data set that includes demographic information associated with each of the residential unit locations to establish a residential units data set. In an embodiment, demographic information includes location information, such as a street address for the residential unit.

In step 1830 a determination is made whether a rooftop for the received residential unit has line of sight to one or more radio transmitters within the set of radio transmitters sufficient to enable the residential unit to receive the line of sight radio service. In an embodiment the determination of whether the rooftop for the received residential unit has line of sight to a radio transmitter within the set of radio transmitters sufficient to enable the residential unit to receive the radio service includes applying an ARCGIS viewshed function to determine whether the received residential unit is visible from one or more radio transmitter within the set of radio transmitters. In an alternate embodiment, a service quality ranking is generated based on a level of visibility between the residential unit and a transmitter site within the set of radio transmitters that provides the highest level of visibility among radio transmitters within the set of radio transmitters. For example, a scale assigning a poor, good and excellent ranking is used.

The poor, good and excellent ratings can be applied based on a variety of factors including, but not limited to, the size of a region that is generated from the cross section analysis, the proximity of the residential unit to the transmitter location, and seasonal variations due to changes in foliage. With respect to seasonal variations, multiple LIDAR based residential units data sets including data drawn during summer and data drawn during winter may be used.

In step 1840 an indication based on the results of step 1830 is generated that identifies whether the residential unit is capable of receiving the line of sight radio service.

In step 1850 the indication is transmitted to the requesting device. In an additional embodiment the service quality ranking is transmitted. The requesting device is configured to display the indication whether the residential location can receive the radio service, and the associated service quality ranking.

In step 1860 method 1800 ends.

FIG. 19 provides a flowchart of computer-implemented method 1900 for determining the placement of an antenna on a rooftop to receive a line of sight radio service, according to an embodiment of the invention. In an embodiment of the invention, the line of sight radio service is multichannel video and data distribution service (MVDDS).

Method 1900 begins in step 1910. In step 1910 a request for placement of the antenna is received. The request includes a location indicator, such as an address, for the rooftop associated with a residence that desires to receive a line of sight radio service. In an embodiment receiving a request for placement of the antenna includes receiving the request from a requesting device that is remote relative to a device hosting the residential units database set. The requesting device includes, but is not limited to a computer, tablet computer, smartphone or electronic personal data assistant. For example, a sales personnel using a smartphone or tablet computer may wirelessly access a host computer that houses a residential units data set. Alternatively, the residential units data set, or a subset of the residential units data set may be housed within a smartphone or tablet computer, such that there is no need to access a host computer, but rather all data necessary to implement method 1900 is locally maintained.

In step 1920 a transmitter to provide the line of sight radio service is identified. In an embodiment, a database identifies one or more transmitter site that services a residential unit. For each residence, a primary transmitter site is identified. Method 1900 will be implemented using the primary transmitter site initially. Further analysis can be conducted by implementing Method 1900 using secondary transmitter sites, including, but not limited to using a combination of the primary transmitter site and secondary transmitter sites.

In step 1930 a residential units data set for the service area is accessed. In an embodiment the residential units data set is based on a light detection and ranging (LIDAR) data set and includes data representative of a plurality of residential units with each residential unit having rooftop data and a location. In embodiments, the rooftop data includes rooftop area, rooftop location, rooftop height and rooftop slope information.

As discussed above with respect to step 1220, in an embodiment a building units data set is created by accessing a light detection and ranging (LIDAR) data set for the potential service area. The LIDAR data set is gridded into a bare earth layer and a first return layer. The bare earth layer is then subtracted from the first return layer to form an above ground level (AGL) layer data set. A height mask is then applied to the AGL layer data set to form the building units data set, which includes data representative of potential building unit rooftops. As discussed above various filtering and other algorithms can be applied to the building units data set to further refine the data set to more accurately identify pixel data within the data set that is associated with residential rooftops. Addresses for the residences associated with the residential rooftops can then be determined, as explained above. In an embodiment, a residential demographic information data set is associated with the building units data set that includes demographic information associated with each of the residential unit locations to establish a residential units data set. In an embodiment, demographic information includes location information, such as a street address for the residential unit.

In step 1940 a cross section analysis of a line of sight from the transmitter with data representative of the rooftop within the residential units data set to identify regions on the rooftop that have line of sight with the transmitter is conducted. In an embodiment, a service quality ranking based on a level of visibility between the rooftop of the residential unit and the transmitter is generated. For example, a scale assigning a poor, good and excellent ranking is used. The poor, good and excellent ratings can be applied based on a variety of factors including, but not limited to, the size of a region that is generated from the cross section analysis, the proximity of the residential unit to the transmitter location, and seasonal variations due to changes in foliage. With respect to seasonal variations, multiple LIDAR based residential units data sets including data drawn during summer and data drawn during winter may be used.

Additionally, in an embodiment orientation of the antenna to provide the highest service quality ranking is determined. This determination is based on the type of antenna and mounting configurations available, the slope of the rooftop and the height of the transmitter. As will be known by individuals skilled in the art and teaching herein, the angle and direction of the antenna is determined that achieves the strongest received signal.

In step 1950 regions of the rooftop that have line of sight with the transmitter are displayed. In an embodiment, displaying regions on the rooftop that have line of sight with the transmitter includes overlaying the identified regions on the rooftop with aerial images of the rooftop to superimpose the regions rooftop that have line of sight with the transmitter on an image of the rooftop. Additionally, service quality rankings for regions of the rooftop are displayed in alternative embodiments. In these embodiments, color coding of the regions may be used to identify the regions which are poor, good or excellent for example. When a remote device is used to access a host computer housing the residential units data set, the images representative of regions on the rooftop that have line of sight with the transmitter are transmitted to the requesting device for display on the remote device. Additionally, in an embodiment data and images providing the preferred orientation of the antenna are transmitted and displayed. The requesting device is configured to display the requested information that has been transmitted.

In step 1960 method 1900 ends.

Computer System Implementation

FIG. 20 is a diagram of a computer system on which the methods and systems herein described can be implemented, according to an embodiment of the invention. Computer 2000 includes one or more processors (also called central processing units, or CPUs), such as processor 2010. Processor 2010 is connected to communication bus 2020. Computer 2000 also includes a main or primary memory 2030, preferably random access memory (RAM). Primary memory 2030 has stored therein control logic (computer software), and data.

Computer 2000 may also include one or more secondary storage devices 2040. Secondary storage devices 2040 include, for example, hard disk drive 2050 and/or removable storage device or drive 2060. Removable storage drive 2060 represents a floppy disk drive, a magnetic tape drive, a compact disk drive, an optical storage device, tape backup, thumb drive, etc.

Removable storage drive 2060 interacts with removable storage unit 2070. As will be appreciated, removable storage unit 2060 includes a computer usable or readable storage medium having stored therein computer software (control logic) and/or data. Removable storage drive 2060 reads from and/or writes to the removable storage unit 2070 in a well known manner.

Removable storage unit 2070, also called a program storage device or a computer program product, represents a floppy disk, magnetic tape, compact disk, optical storage disk, thumb drive, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 2000, or multiple computer 2000s to perform any combination of the functions described herein.

Computer programs (also called computer control logic) are stored in main memory 2030 and/or the secondary storage devices 2040. Such computer programs, when executed, direct computer 2000 to perform the functions of the present invention as discussed herein. In particular, the computer programs, when executed, enable processor 2010 to perform the functions of the present invention. Accordingly, such computer programs represent controllers of the computer 2000.

Computer 2000 also includes input/output/display devices 2080, such as monitors, keyboards, pointing devices, etc.

Computer 2000 further includes a communication or network interface 2090. Network interface 2090 enables computer 2000 to communicate with remote devices. For example, network interface 2090 allows computer 2000 to communicate over communication networks, such as LANs, WANs, the Internet, etc. Network interface 2090 may interface with remote sites or networks via wired or wireless connections. Computer 2000 receives data and/or computer programs via network interface 2090.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for determining whether a residential unit is capable of receiving a line of sight radio service from one or more radio transmitters within a set of radio transmitters providing the line of sight radio service within a service area, comprising:
   receiving a request to determine whether the residential unit is capable of receiving the line of sight radio service;
   accessing a residential units data set for the service area, wherein the residential units data includes data representative of a plurality of residential units with each residential unit having rooftop data and a location;
   determining whether a rooftop for the received residential unit has line of sight to one or more radio transmitters within the set of radio transmitters sufficient to enable the residential unit to receive the line of sight radio service; and
   generating an indication whether the residential unit is capable of receiving the line of sight radio service.

2. The computer-implemented method of claim 1, wherein the residential units data set is created by a computer-implemented method comprising:
   accessing a light detection and ranging (LIDAR) data set for the service area, wherein the LIDAR data set is gridded into a bare earth layer and a first return layer;
   subtracting the bare earth layer from the first return layer to form an above ground level (AGL) layer data set;
   applying a height mask to the AGL layer data set to form a building units data set, wherein the building units data set includes data representative of building unit rooftops; and
   identifying data within the building units data set that represents residential units to establish a residential units data set.

3. The computer-implemented method of claim 1, wherein receiving the request to determine whether the residential unit is capable of receiving the radio service includes receiving the request from a requesting device that is remote relative to a device hosting the residential units database set.

4. The computer-implemented method of claim 3, wherein the requesting device is a computer, tablet computer, smartphone or electronic personal data assistant.

5. The computer-implemented method of claim 1, determining whether the rooftop for the received residential unit has line of sight to a radio transmitter within the set of radio transmitters sufficient to enable the residential unit to receive the radio service includes applying an ARCGIS viewshed function to determine whether the received residential unit is visible from one or more radio transmitter within the set of radio transmitters.

6. The computer-implemented method of claim 1, further comprising generating a service quality ranking based on a level of visibility between the residential unit and a transmitter site within the set of radio transmitters that provides the highest level of visibility among radio transmitters within the set of radio transmitters.

7. The computer-implemented method of claim 6, further comprising transmitting the indication that the residential unit is capable of receiving the radio service and the service quality ranking.

8. The computer-implemented method of claim 1, further comprising transmitting the indication whether the residential unit is capable of receiving the radio service.

9. The computer-implemented method of claim 1, further comprising associating a residential demographic information data set with the residential units data set that includes demographic information associated with each of the residential units.

10. The computer-implemented method of claim 1, wherein the line of sight radio service is Multichannel Video and Data Distribution Service.

11. The computer-implemented method of claim 1, wherein the line of sight radio service is Multichannel Video and Data Distribution Service.

12. A computer-implemented method for determining the placement of an antenna on a rooftop to receive line of sight radio service, comprising:
 receiving a request for placement of the antenna, wherein the request includes a location indicator for the rooftop;
 identifying a transmitter to provide the line of sight radio service;
 accessing a residential units data set for the service area, wherein the residential units data set includes data representative of a plurality of residential units with each residential unit having rooftop data and a location; and
 conducting a cross section analysis of a line of sight from the transmitter with data representative of the rooftop to identify regions on the rooftop that have line of sight with the transmitter.

13. The computer-implemented method of claim 12, further comprising displaying regions on the rooftop that have line of sight with the transmitter.

14. The computer-implemented method of claim 13, wherein displaying regions on the rooftop that have line of sight with the transmitter includes overlaying the identified regions on the rooftop with aerial images of the rooftop to superimpose the regions on the rooftop that have line of sight with the transmitter on an image of the rooftop.

15. The computer-implemented method of claim 14, further comprising generating a service quality ranking based on a level of visibility between the residential unit and the transmitter and displaying service quality rankings for regions on the rooftop.

16. The computer-implemented method of claim 13, wherein the residential units data set is created by a computer-implemented method comprising:
 accessing a light detection and ranging (LIDAR) data set for the service area, wherein the LIDAR data set is gridded into a bare earth layer and a first return layer;
 subtracting the bare earth layer from the first return layer to form an above ground level (AGL) layer data set;
 applying a height mask to the AGL layer data set to form a building units data set, wherein the building units data set includes data representative of building unit rooftops; and
 identifying data within the building units data set that represents residential units to establish a residential units data set.

17. The computer-implemented method of claim 12, wherein receiving a request for placement of the antenna, includes receiving the request from a requesting device that is remote relative to a device hosting the residential units database set.

18. The computer-implemented method of claim 17, wherein the requesting device is a computer, tablet computer, smartphone or electronic personal data assistant.

19. The computer-implemented method of claim 18, further comprising transmitting images representative of regions on the rooftop that have line of sight with the transmitter to the requesting device.

20. The computer-implemented method of claim 12, further comprising determining a preferred orientation of the antenna.

21. The computer-implemented method of claim 20, further comprising transmitting the preferred orientation of the antenna.

* * * * *